United States Patent
Hermann et al.

(10) Patent No.: US 10,428,898 B2
(45) Date of Patent: Oct. 1, 2019

(54) HYDROELASTIC BEARING

(71) Applicant: SumiRiko AVS Germany GmbH, Steinau an der Straße (DE)

(72) Inventors: Waldemar Hermann, Lettgenbrunn (DE); Xiaofeng Shao, Jiangsu (CN); Jiaping Yan, Jiangsu (CN)

(73) Assignee: SumiRiko AVS Germany GmbH, Steinau an der Strasse (DE)

( * ) Notice: Subject to any disclaimer, the term of this patent is extended or adjusted under 35 U.S.C. 154(b) by 0 days.

(21) Appl. No.: 15/824,178

(22) Filed: Nov. 28, 2017

(65) Prior Publication Data

US 2018/0156305 A1 Jun. 7, 2018

(30) Foreign Application Priority Data

Dec. 1, 2016 (DE) .................. 10 2016 014 315

(51) Int. Cl.
*F16F 13/14* (2006.01)

(52) U.S. Cl.
CPC ...... *F16F 13/1427* (2013.01); *F16F 13/1463* (2013.01)

(58) Field of Classification Search
CPC ............. F16F 13/1427; F16F 13/1463; F16F 13/1418; F16F 13/18; F16F 15/161
USPC ........................................ 267/140.11, 141.5
See application file for complete search history.

(56) References Cited

U.S. PATENT DOCUMENTS

| 4,869,475 A | * | 9/1989 | Bouhier | F16F 13/1427 267/140.12 |
| 4,895,353 A | * | 1/1990 | Roth | F16F 13/1427 267/140.12 |
| 4,896,868 A | * | 1/1990 | Thelamon | F16F 13/1427 267/140.12 |
| 5,044,813 A | * | 9/1991 | Gregg | F16F 13/1427 267/140.12 |
| 5,286,011 A | * | 2/1994 | Strand | F16F 13/20 267/140.12 |
| 6,561,501 B2 | * | 5/2003 | Bouhier | F16F 13/1418 267/140.12 |
| 8,128,075 B2 | * | 3/2012 | Kato | F16F 13/1427 267/140.12 |

(Continued)

FOREIGN PATENT DOCUMENTS

EP 1701057 A1 9/2006
FR 2831631 A1 5/2003

*Primary Examiner* — Thomas W Irvin
(74) *Attorney, Agent, or Firm* — Armstrong Teasdale LLP

(57) ABSTRACT

A hydroelastic bearing is provided. The hydroelastic bearing includes a spring function member and an outer sleeve coupled to the spring function member, wherein the spring function member includes an inner mounting connection and at least two working chambers which are filled with a damping fluid and which are connected via at least one damping channel, so that the damping fluid flows from one of the working chambers at least partly to the other via the at least one damping channel upon displacement of the inner mounting connection with respect to the outer sleeve, wherein the working chambers are further connected via at least one decoupling channel, wherein a decoupling element is arranged in a flow path of the decoupling channel, and wherein the decoupling channel and the decoupling element are at least partly arranged in a decoupling recess in the outer sleeve provided therefor.

20 Claims, 11 Drawing Sheets

(56) References Cited

U.S. PATENT DOCUMENTS

| | | | |
|---|---|---|---|
| 8,500,109 B2* | 8/2013 | Takeshima | B60K 5/1208 |
| | | | 267/293 |
| 8,839,900 B2* | 9/2014 | Kim | F16F 13/1463 |
| | | | 180/312 |
| 9,217,488 B2* | 12/2015 | Cha | F16F 13/1463 |
| 9,377,078 B2* | 6/2016 | Kadowaki | F16F 13/1463 |
| 2013/0062822 A1* | 3/2013 | Matsushita | F16F 13/1409 |
| | | | 267/219 |
| 2015/0102543 A1* | 4/2015 | Moon | F16F 13/1409 |
| | | | 267/140.12 |
| 2017/0175844 A1* | 6/2017 | Kadowaki | B60G 15/06 |
| 2019/0063544 A1* | 2/2019 | Werner | F16F 13/1463 |

* cited by examiner

HYDROELASTIC BEARING

CROSS REFERENCE TO RELATED APPLICATIONS

This application claims the benefit of DE Patent Application No. 10 2016 014 315.0 filed Dec. 1, 2016, which is hereby incorporated by reference in its entirety.

BACKGROUND

The disclosure relates to a hydroelastic bearing, in particular for use in a motor vehicle. The hydroelastic bearing can for example be used to bear a subframe or a wheel connecting rod, in particular a control arm. The hydroelastic bearing can also be used as a bearing for aggregates, as well as to bear the oscillating mass of a mass damper.

The hydroelastic bearing is generally used when a relative movement of a component subject to oscillations such as a motor vehicle component is to be approved for the body and dampened. The hydroelastic bearing offers restorative spring force from the use of elastomer material, as well as damping force which is actively generated in the bearing by means of dissipation loss.

In general, the hydroelastic bearing has a spring function member and an outer sleeve coupled to the spring function member. The spring function member has an inner mounting connection by means of which the bearing is to be mounted on a component subject to a vibration load, such as the body of a motor vehicle. The outer sleeve is generally fastened to the motor vehicle part that is to be connected to the motor vehicle body. The spring function member is mounted in the outer sleeve and is connected by an outer mounting connection of the spring function member to the outer sleeve. A reverse connection of the spring function member to the motor vehicle body and the motor vehicle component can also be considered. A spring body of the spring function member couples the mounting connections to each other in order to permit a relative movement between the mounting connections, or respectively between the inner mounting connection and the outer sleeve. The spring body at least partly borders two working chambers for holding a damping fluid. The working chambers can communicate fluidically with each other by a damping channel to permit an exchange of fluid between the working chambers given a specific, relative deflection of the inner mounting connection and outer sleeve and changes in volume to the working chamber caused thereby, and to generate dissipation loss by the flow between the working chambers.

The damping properties can be established by adjustments to the flow resonance of the damping channel and the working chambers. With conventional hydroelastic bearings, the hydroelastic bearing, despite such an adjustment of the damping properties, can manifest high dynamic rigidity due to the flow resonances in the damping channel within a specific excitation frequency range, and at specific excitation amplitudes. This can be the case in particular at medium-high excitation frequencies and simultaneous low amplitudes. Medium-high excitation frequencies can be excitation frequencies within a range between approximately 20 Hz and approximately 300 Hz, which is particularly relevant with regard to the development of noise by a road. By low amplitudes, such amplitudes are meant that normally occur in this medium high-frequency range of a road.

To prevent dynamic rigidification of the hydroelastic bearing at low amplitudes, isolators can be provided in the hydroelastic bearing. Generally, the isolator is arranged in an additional decoupling channel, wherein the decoupling channel also connects the working chambers, and wherein the decoupling channel is typically designed with a diameter that is larger and a length that is smaller than the damping channel. The isolator is designed flexible, or respectively movable, and is arranged in the decoupling channel. The isolator ensures that at low excitation amplitudes, the damping fluid can flow in and out of the decoupling channel, whereby at low excitation amplitudes, the working chambers can be isolated, and dynamic rigidification from the flow resonances in the damping channel can be prevented. At high excitation amplitudes, the isolator contrastingly closes the decoupling channel so that the damping fluid flows through the damping channel.

Until now, however, no isolation apparatus has been developed that permits a satisfactory adjustment of the dynamic properties of the hydroelastic bearing.

BRIEF DESCRIPTION

The present disclosure therefore provides a hydroelastic bearing that permits improved adjustment of the dynamic properties.

This is achieved by the features of the independent claim. Example embodiments can be found in the dependent claims.

According to the present disclosure, a hydroelastic bearing is provided that has a spring function member and an outer sleeve coupled to the spring function member, wherein the spring function member includes an inner mounting connection and at least two working chambers filled with a dampening fluid and connected via at least one damping channel so that when the inner mounting connection is deflected relative to the outer sleeve, the damping fluid flows at least partly through the damping channel from one working chamber into the other, wherein the working chambers are further connected via at least one decoupling channel, wherein a decoupling element is arranged in a flow path of the decoupling channel, and wherein the decoupling channel and the decoupling element are at least partly arranged in a decoupling recess in the outer sleeve provided therefor.

Advantageously, by arranging the decoupling channel and decoupling element in the decoupling recess of the outer sleeve, an improvement is enabled of the adjustability of the dynamic properties of the hydroelastic bearing. In particular, additional installation space is provided for the decoupling channel and the decoupling element outside of the spring function member so that significant play is created for the configuration of the decoupling channel and decoupling element without influencing, or respectively impairing the function of the spring function member. Moreover, the flow path of the decoupling channel can be designed more effectively by the additional installation space.

The dynamic properties of the hydroelastic bearing can be adjusted by the configuration of the decoupling channel and/or the decoupling element. The decoupling channel and the decoupling element can be configured such that, at low excitation amplitudes, the damping fluid flows primarily into and out of the decoupling channel which can prevent dynamic rigidification at these excitation amplitudes. Contrastingly, the decoupling channel and the decoupling element can be configured such that the decoupling element substantially closes the decoupling channel at high excitation amplitudes so that, at these high excitation amplitudes, the damping fluid flows exclusively, or respectively at least primarily, through the damping channel.

The decoupling channel can in principle be designed larger in diameter and smaller in length than the damping channel. The decoupling channel extends between the two working chambers and connects them, wherein however the decoupling element is arranged in the flow path of the decoupling channel. The decoupling element is arranged such that it disconnects, or respectively splits the decoupling channel at a side connected to a working chamber, and at another side connected to the other working chamber. The decoupling element can be securely, i.e. immovably clamped, wherein a fluid exchange between the two working chambers via the decoupling channel then does not occur, and a flow of the damping fluid into and out of the decoupling channel is only enabled by the elastic resilience of the decoupling element. The decoupling element can also be arranged loosely, i.e., movably, in an isolator seat, whereas a flow of the damping fluid into and out of the decoupling channel is enabled by a shift of the decoupling element, in particular a back-and-forth movement of the decoupling element in the isolator seat, in addition to a possible elastic resilience of the decoupling element. Given a movable arrangement of the decoupling element, a certain exchange of fluid via the decoupling channel can occur between the two working chambers that flows around the decoupling element, wherein such a fluid exchange basically occurs only at low excitation amplitudes since, at high excitation amplitudes, the decoupling channel is closed by the pressed decoupling element.

The dynamic properties of the hydroelastic bearing can for example be adjusted by changing the length, cross-section, and/or the cross-sectional path of the decoupling channel, by changing the elastic resilience of the decoupling element, the shape and/or weight, and/or arrangement of the decoupling element, and/or by changing the play of the decoupling element in the isolator seat. By providing the decoupling recess in the outer sleeve, these parameters can be changed and adjusted within a wide range and without restrictions from the installation space.

The decoupling recess is provided in the outer sleeve in addition to the recess for accommodating the spring function member. The recess for accommodating the spring function member can be designed substantially cylindrical, and the spring function member can be correspondingly designed substantially cylindrical as well. By the additional decoupling recess, the spring function member can be designed substantially symmetrical, in particular with regard to the design of the spring body and the working chambers since no additional space needs to be provided for the decoupling channel and the decoupling element in the spring function member. Given a sufficiently large wall thickness of the outer sleeve and/or sufficiently small dimension of the decoupling recess, the outer contour of the outer sleeve can be designed substantially cylindrical, and the decoupling recess can be designed in the inner wall of the outer sleeve. The outer contour of the outer sleeve can, however, also have a curvature, or respectively bulge in order to provide the necessary space for the decoupling recess, or respectively the decoupling channel and the decoupling element in the outer sleeve. The outer sleeve can have an asymmetrical shape. The outer sleeve can have a fastening section, for example to fasten a motor vehicle part that is to be joined to a motor vehicle body. It is also conceivable to provide two decoupling recesses in the outer sleeve with decoupling channels and decoupling elements arranged therein, wherein the decoupling recesses can be designed to lie opposite each other, in particular diametrically opposite each other, in the outer sleeve which enables a particularly symmetrical structure of the hydroelastic bearing.

The decoupling channel can be formed in the outer sleeve, in particular in the material of the outer sleeve. The outer sleeve can moreover have an isolator seat for accommodating the decoupling element. Alternatively, the decoupling channel can be formed in a decoupling insert that is inserted or respectively, placed in the decoupling recess, wherein the decoupling insert can have the isolator seat for accommodating the decoupling element. The decoupling channel can also be bordered, or respectively closed radially to the inside by the spring function member, and not by the material of the outer sleeve or the decoupling insert.

In some embodiments, the decoupling recess is designed to lie radially to the outside opposite the spring function member.

Due to the decoupling recess that lies radially to the outside opposite the spring function member, additional installation space can be provided for the decoupling channel and the decoupling element at a suitable location, such as on the outer perimeter of the spring function member between the two working chambers, whereby the dynamic properties of the hydroelastic bearing can be adjusted more effectively without influencing the function of the spring function member.

In some embodiments, the hydroelastic bearing also has a decoupling insert that is at least partly placed in the decoupling recess, wherein the decoupling channel is formed in the decoupling insert, and wherein the decoupling element is arranged in the decoupling insert.

Radially to the outside and in an axial direction, the shape of the decoupling insert can be adapted to the contour of the decoupling recess, and radially to the inside, the shape of the decoupling insert can be adapted to the outer contour of the spring function member. The decoupling insert can be clamped between the inner wall of the outer sleeve, or respectively between the decoupling recess and the outer wall of the spring function member. The decoupling channel can extend through the decoupling insert, wherein the ends of the decoupling channel can each terminate in one of the working chambers. In the decoupling insert, an isolation seat can be formed for movably or immovably accommodating the decoupling element.

In some embodiments, the decoupling insert includes two insert parts, and the decoupling element is arranged between the two insert parts.

The two insert parts can each have a section of the decoupling channel formed therein. The two insert parts can be assembled to supplement the decoupling insert, wherein the isolation seat can be formed between the two insert parts. The decoupling insert can also have more than two insert parts to supplement the decoupling insert when assembled.

In some embodiments, the decoupling element is an elastomeric plate or a clamped elastomeric membrane.

The decoupling element can be an elastomeric plate or a clamped elastomeric membrane with a substantially rectangular shape. The decoupling element can have a peripheral bead in the edge region that surrounds a surface section with a smaller wall thickness. In particular, this surface section with the smaller wall thickness can be arranged in the flow path of the decoupling channel such that the damping fluid contacts both opposing sides of the surface section when the hydroelastic bearing is operating.

In some embodiments, a hitting-surface of the decoupling element onto which the damping fluid hits, is inclined in a predetermined angle to an axial direction of the hydroelastic bearing and/or a radial direction of the hydroelastic bearing.

The dynamic properties of the hydroelastic bearing can be further influenced and adjusted by the angle of the decoupling element relative to the hydroelastic bearing and the angle of the direction of vibration of the decoupling element relative to the hydroelastic bearing that this causes. By a suitable arrangement of the decoupling element, additional configurations of the decoupling channel are moreover possible, in particular with respect to the channel route.

The damping fluid may contact the hitting-surface substantially perpendicular. The decoupling element has two hitting-surfaces that face away from each other which may be arranged parallel to each other. Both hitting-surfaces can be angled at the predetermined angle relative to the axial direction of the hydroelastic bearing, and/or to the radial direction of the hydroelastic bearing.

In some embodiments, at least one overpressure-passage is formed in the decoupling element.

The overpressure-passage is closed up to a predetermined or predeterminable pressure that is applied to the decoupling element. At a pressure above the predetermined or predeterminable pressure, the overpressure-passage opens and connects both sides of the decoupling channel to each other, and hence both working chambers to each other as well. Given the overpressure-passage, the decoupling element and the decoupling channel can also have the function of an overpressure valve that prevents the membrane of the working chambers of the spring function member from bursting under high loads. The overpressure-passage can be designed as a linear or cruciform slot in the decoupling element. The decoupling element can have a plurality of overpressure-passages.

In some embodiments, at least one stopping burl is formed on the decoupling element.

The acoustic properties of the hydroelastic bearing can be improved by the stopping burl. The stopping burl can be configured so that when the decoupling element moves back and forth in the isolation seat, the stopping burl contacts the inner wall of the isolation seat which reduces contact noise. The decoupling element can have a plurality of stopping burls.

In some embodiments, the flow path of the damping fluid from one working chamber via the decoupling channel to the other working chamber does not include abrupt changes of direction, particularly no corners.

A flow path in the decoupling channel with smooth changes in direction is particularly advantageous for the function of the decoupling channel and decoupling element, i.e., reducing the dynamic rigidification of the hydroelastic bearing at low amplitudes, since less swirling occurs with smooth, or respectively flow-optimized transitions without abrupt changes in direction of the damping fluid that on their part could cause dynamic rigidification. By providing the decoupling recess in the outer sleeve, the hydroelastic bearing can be designed so that the damping fluid can run without abrupt changes in direction from one working chamber via the decoupling channel to the decoupling element, and on the other hand from the decoupling element via the decoupling channel to the other working chamber.

In some embodiments, the hydroelastic bearing has a plurality of decoupling channels which connect the working chambers, wherein the decoupling element is arranged in flow paths of all decoupling channels.

The hydroelastic bearing can for example have 2, 3, 4, 5, 6 or more decoupling channels. The decoupling channels can be arranged parallel to each other and for example extend in an axial direction or peripheral direction of the hydroelastic bearing. The decoupling element may extend in the isolation seat such that it blocks the flow paths of all decoupling channels. However, a plurality of decoupling elements such as one decoupling element per decoupling channel can also be provided.

BRIEF DESCRIPTION OF THE DRAWINGS

In the following, example embodiments will be described in greater detail with reference to the accompanying figures. Of course, the disclosure is not restricted to these embodiments, and individual features of the embodiments can be combined with other embodiments.

In the following.

DETAILED DESCRIPTION

Figure 1:
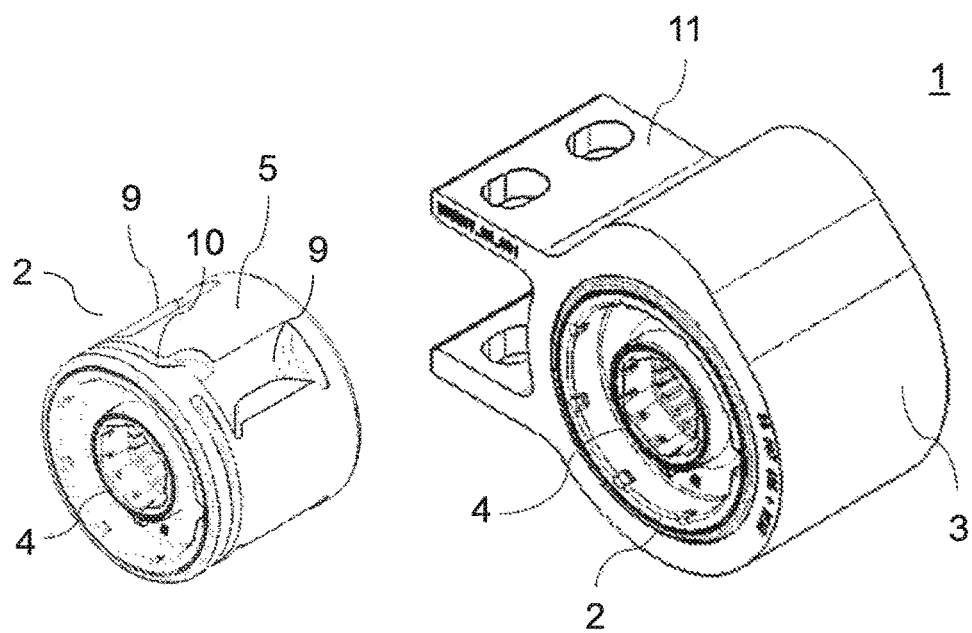
FIG. 1 shows a perspective view of a hydroelastic bearing according to a first embodiment as well as a spring function member thereof.
Figure 2:
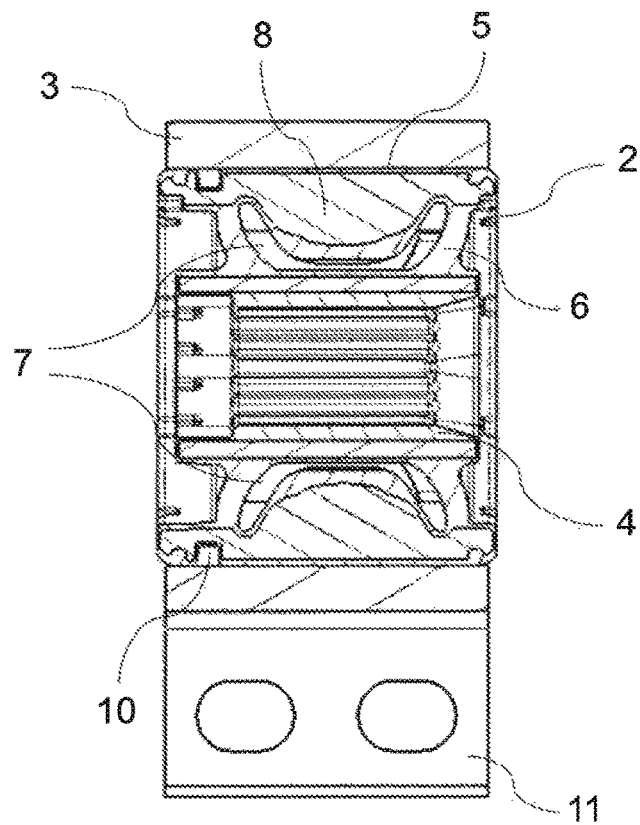
FIG. 2 shows a sectional view of the hydroelastic bearing from FIG. 1 in an axial direction.

FIGS. 1 to 9 show a hydroelastic bearing 1 according to a first embodiment, as well as components thereof in different views. FIG. 1 shows a perspective view of a hydroelastic bearing 1 according to the first embodiment, as well as a spring function member 2 thereof that, together with the outer sleeve 3, into which the spring function member 2 is pressed, forms the hydroelastic bearing 1.

In the present embodiment, the outer sleeve 3 is a solid, or respectively thick-wall fastening sleeve, or respectively bushing for fastening the hydroelastic bearing 1 to a motor vehicle part to be connected to the motor vehicle body. Alternatively, the outer sleeve 3 can, however, also be the motor vehicle part per se that is to be connected to the motor vehicle body and has a corresponding, substantially cylindrical seat for accommodating the spring function member 2. The outer sleeve 3 can for example be made of steel, aluminum or plastic. The diameter of the outer sleeve 3 can for example be about 30 mm to about 150 mm.

The spring function member 2 has an outer mounting connection 5 that radially surrounds the inner mounting connection 4 and is coupled to the outer sleeve 3, a spring body 6, including vulcanized elastomer, that at least partly borders the at least two working chambers 7, 7 and couples the inner and outer mounting connection 4, 5 to permit relative mobility between the inner and outer mounting connection 4, 5, and a support frame 8 that surrounds the inner mounting connection 4 and includes a rigid material, wherein each of the at least two working chambers 7 terminates in at least one radial opening 9 that is open to the radial outside of the spring function member 2 and is closed by the outer sleeve 3 coupled to the outer mounting connection 5.

The spring function member 2 has the inner mounting connection 4 for installing the hydroelastic bearing 1 in particular on a vehicle body, and the outer mounting connection 5 for installing the spring function member 2 on the outer sleeve 3. For installation, the spring function member 2 can be pressed in an axial direction into the outer sleeve 3. The inner mounting connection 4 can be formed by an inner fitting including a rigid material such as plastic or metal and in some embodiments, aluminum. It is alternatively possible to realize the inner mounting connection 4 exclusively by a cutout in the spring body 6 of the hydroelastic bearing 1 without using a rigid inner fitting. The outer mounting connection 5 is the peripheral outer side of the spring function member 2 that is designed so that it can be securely pressed into the outer sleeve 3 like a fastening bush of the motor vehicle component. To fasten the outer sleeve 3 on the vehicle part, the outer sleeve 3 has a fastening section 11 which includes two fastening plates arranged parallel to each other with installation holes through which threaded bolts can pass. The damping channel 10 is formed in the spring function member 2 and fluidically connects the two working chambers 7 to each other. The damping channel 10 is formed in the radial outer surface of the spring function member 2, or respectively the outer mounting connection 5. Radially to the outside, the damping channel 10 is bordered, or respectively closed by the outer sleeve 3. When the inner mounting connection 4 is deflected, or respectively shifted relative to the outer sleeve 3, or respectively the outer mounting connection 5, the volume in the working chambers 7 changes such that the damping fluid flows from one of the working chambers 7 into the other working chamber 7, wherein the desired damping is brought about by the flow loss.

The sleeve-shaped support frame 8 that surrounds the inner mounting connection 4 is made of a rigid material such as plastic or metal, and in some embodiments, aluminum. The support frame 8 can be cylindrical, oval or polygonal depending upon the design of the bearing 1. The support frame 8 defines an axial direction and is designed as an at least sectionally closed ring-shape reinforcing sleeve in order to form a sufficiently rigid cage structure that stabilizes the shape or reinforces the spring body 6. The support frame 8 can form the outer mounting connection 5 or be connected thereto substantially rigidly.

The spring body 6 is made of elastomer material and partly borders the at least two working chambers 7 for accommodating the damping fluid. The spring body 6 includes vulcanized elastomer. The spring body 6 is in particular vulcanized to the support frame 8 by a vulcanization process. If the inner mounting connection 4 is designed as a rigid inner sleeve, the spring body 6 can be vulcanized to the rigid inner sleeve. For improved adhesion, the metal and/or plastic parts can be provided with an adhesive before vulcanization. The surfaces can also be provided with a primer beforehand. The vulcanized connections of the spring body 6 to the support frame 8, and possibly to the inner sleeve representing the inner mounting connection 4 constitute mechanically stressable and unreleasable surface connections. The working chambers 7 can communicate with each other by the damping channel 10 in order to exchange damping fluid between the working chambers 7. The damping channel 10 can be bordered, or respectively closed in a radial direction by the outer sleeve 3 coupled to the outer mounting connection 5. The spring body 6 couples the inner mounting connection 4 to the support frame 8 such that relative mobility between the inner mounting connection 4 and the support frame 8 is permitted. Given the elastic relative mobility between the inner mounting connection 4 and the support frame 8, the working chambers 7 are deformed depending on the load, whereby a fluid flow exchange occurs between the working chambers 7 that has a dissipating effect. The support frame 8, the outer mounting connection 5 and the outer sleeve 3 can be connected to each other substantially rigidly.

The hydroelastic bearing 1 has a decoupling insert 12 that is arranged in a decoupling recess 13 in the outer sleeve 3. The decoupling insert 12 can be made of plastic or metal. The decoupling insert 12 includes two insert parts 14, or respectively halves that, when assembled, form the decoupling insert 12. To simplify assembly, the insert parts 14 each have installation pins 15 and installation recesses 16 that engage in each other upon assembly. In the connecting region of the two insert parts 14, i.e., between the two insert parts 14, the decoupling insert 12 has an isolator seat 17 for accommodating a decoupling element 18. The isolator seat 17 is designed as an extensive recess in the respective insert parts 14 and is adapted to the shape of the decoupling element 18, and the decoupling element 18 can be inserted therein.

The decoupling insert 12 has four decoupling channels 19 formed therein. Sections of the four decoupling channels 19 are formed in the insert parts 14. The decoupling insert 12 has two common inlet and outlet openings 20 that each connect the ends of the decoupling channels 19 of one side to each other. The two common inlet and outlet openings 20 are connected by a radial opening 9 of a working chamber 7 so that the decoupling channels 19 are connected to the working chambers 7.

Figure 3:
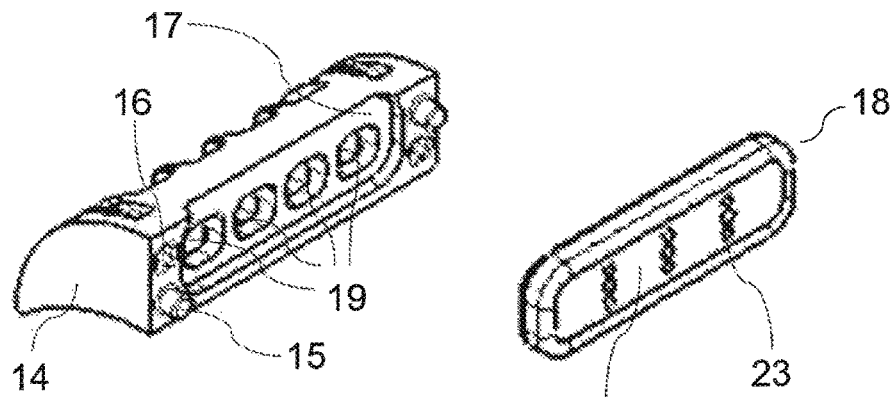
FIG. 3 shows a perspective view of an insert part of a decoupling insert, as well as a decoupling element of the hydroelastic bearing from FIG. 1.
Figure 4:
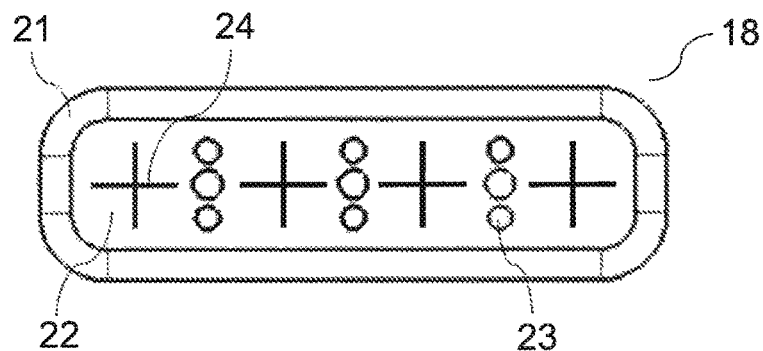
FIG. 4 shows an alternative embodiment of the decoupling element from FIG. 3 in a plan view.
Figure 5:
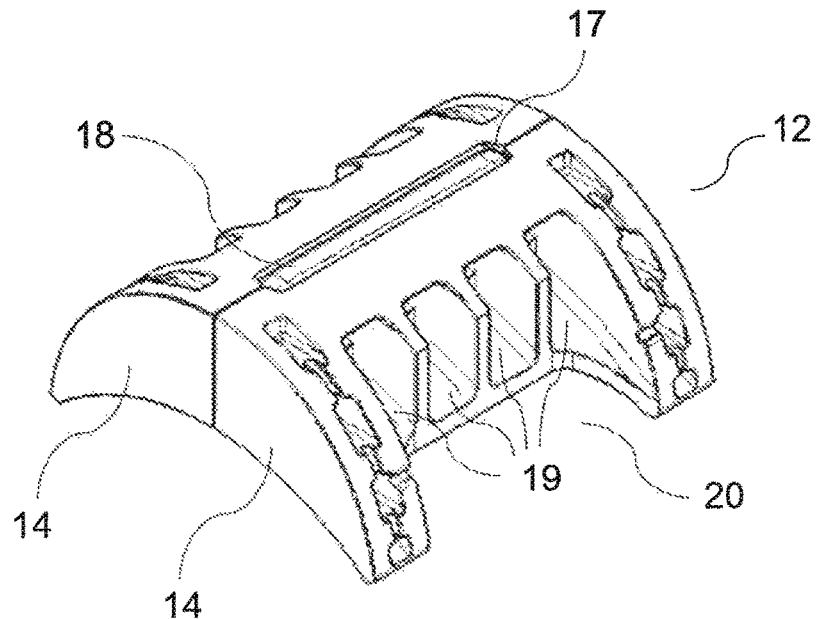
FIG. 5 shows a perspective view of the decoupling insert of the hydroelastic bearing from FIG. 1.

The decoupling element 18 is designed in the form of a substantially rectangular lamella. The decoupling element 18 is arranged in the isolator seat 17 such that the long edge of the decoupling element 18 extends parallel to the axial direction of the hydroelastic bearing 1, and the short edge of the decoupling element 18 extends in a radial direction of the hydroelastic bearing 1. The decoupling element 18 has a peripheral, outer bead 21 that surrounds a hitting-surface 22 of the decoupling element 18. The decoupling element 18 is arranged such that the damping fluid in the decoupling channels 19 contacts the hitting-surfaces 22 on both sides of the decoupling element 18 during operation. As shown in FIG. 3, the decoupling element 18 has stopping burls 23 on the hitting-surface 22 that may be arranged between the contact regions of the damping fluid of the respective decoupling channels 19. The stopping burls 23 are designed to bump against an inner wall of the isolation seat 17 during operation in order to reduce noise generation. FIG. 4 shows a version of a decoupling element 18 in which overpressure-passages 24 are provided in the contact regions of the damping fluid of the respective decoupling channels 19 in addition to the stopping burls 23. The overpressure-passages 24 are configured to let the damping fluid flow via the decoupling element 18 above a predetermined or predeterminable pressure of the damping fluid in the respective decoupling channel 19, which realizes the function of an overpressure valve.

Figure 6:
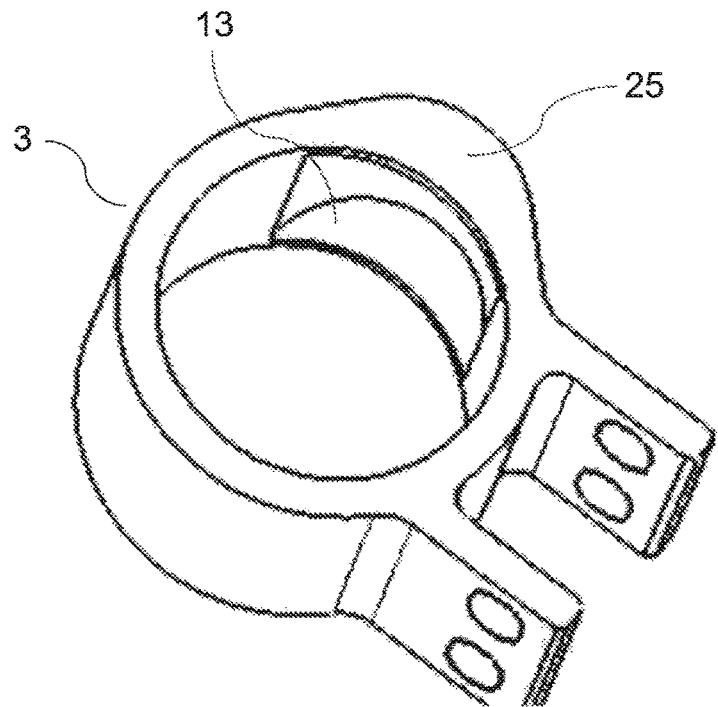
FIG. 6 shows a perspective view of an outer sleeve of the hydroelastic bearing from FIG. 1.
Figure 7:
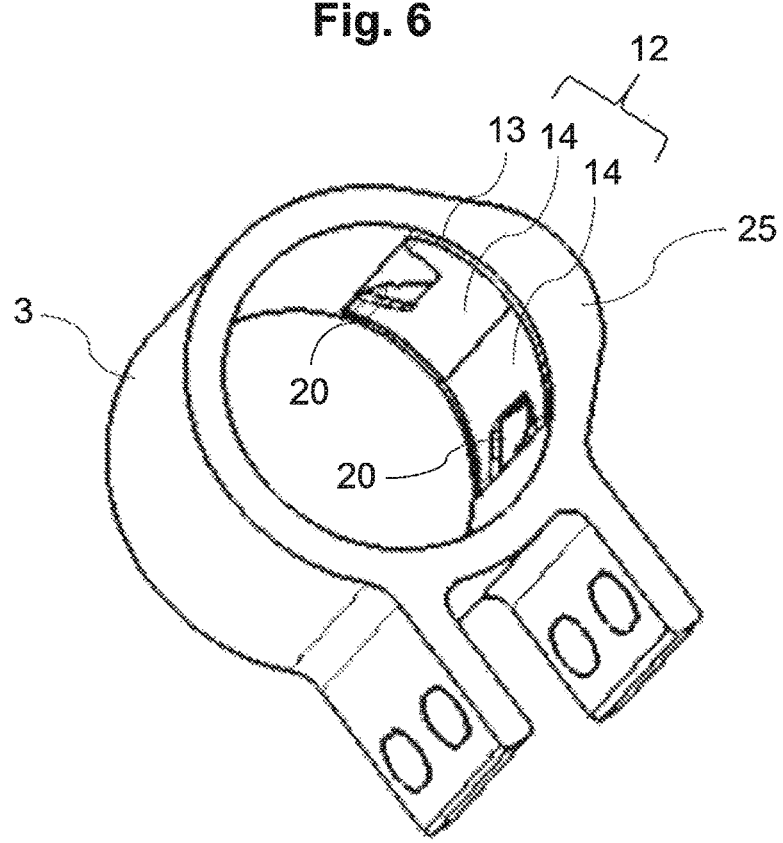
FIG. 7 shows a perspective view of the outer sleeve from FIG. 6 with an inserted decoupling insert.
Figure 8:
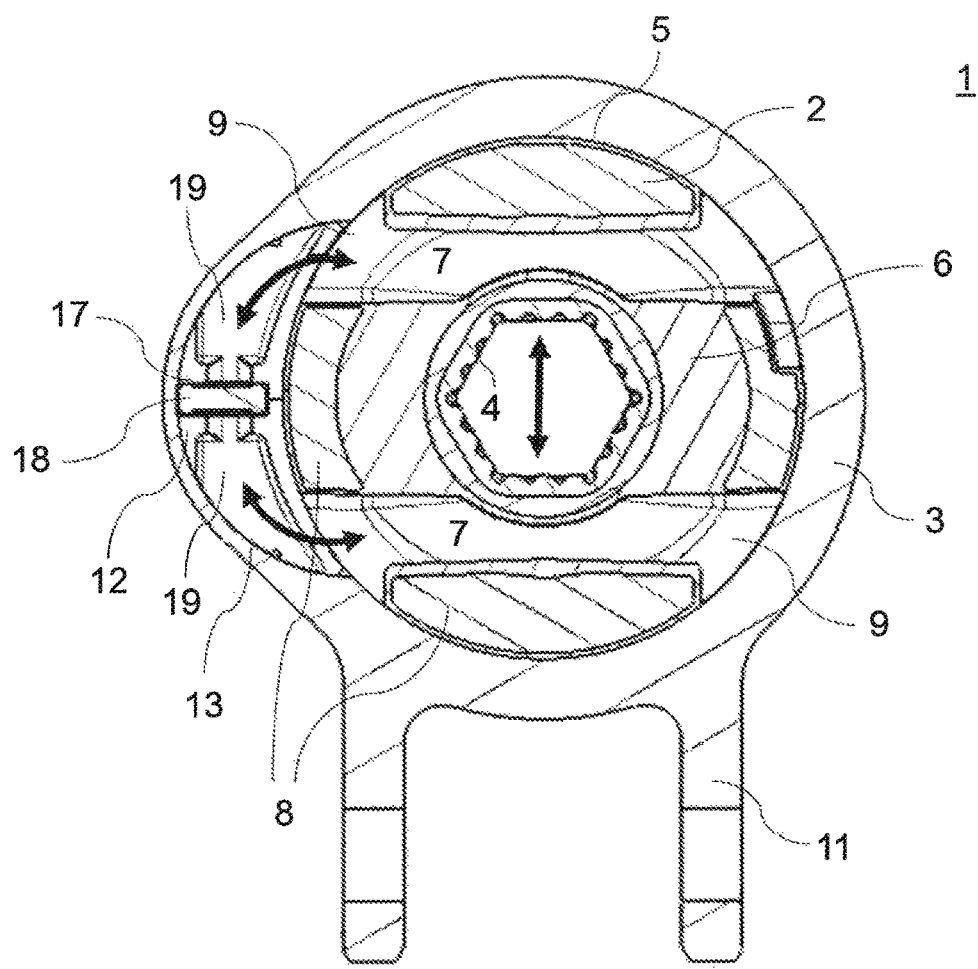
FIG. 8 shows a sectional view of the hydroelastic bearing from FIG. 1 transverse to the axial direction.

FIGS. 6 and 7 show the outer sleeve 3 with the decoupling recess 13, both with and without the inserted decoupling insert 12. The decoupling recess 13 is open radially to the inside. The decoupling recess 13 is bordered by the material of the outer sleeve 3 in an axial direction and in a radial direction to the outside. The decoupling recess 13 has a substantially constant sickle-shaped cross-section in the axial direction. In the region of the decoupling recess 13, the outer sleeve 3 has a curvature 25 that projects radially to the outside in order to provide the necessary installation space for the decoupling recess 13 in the material of the outer sleeve 3.

The shape of the decoupling insert 12, in particular the outer contour thereof, is adapted to the shape of the decoupling recess 13. The decoupling channels 19 that are formed in the decoupling insert 12 can be partially bordered radially to the outside by the inner wall of the decoupling recess 13. The decoupling channels 19 are designed substantially shorter, e.g., approximately 0.1 to approximately 0.4 times shorter, than the damping channel 10. The cross-section of the decoupling channels 19 transverse to the flow direction is substantially larger than the cross-section of the damping channel 10. Accordingly, the sum of the cross-sections of all decoupling channels 19 can be approximately 2 to approximately 10 times as large as the cross-section of the damping channel 10.

Figure 9:
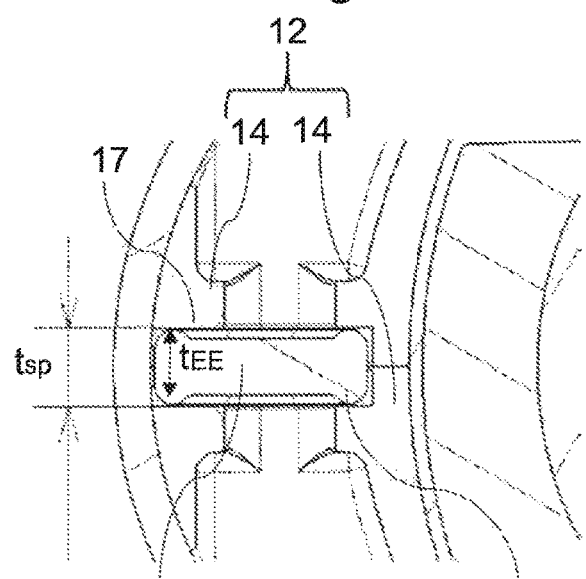
FIG. 9 shows an enlarged view of the decoupling channel and the decoupling element from FIG. 8.

As shown in FIG. 9, the isolator seat 17 has a gap width $t_{sp}$. By adjusting the gap width $t_{sp}$ relative to the thickness $t_{EE}$ of the decoupling element 18, in particular in the region of the bead 21, the vibration behavior of the decoupling element 18, and hence the dynamic vibration behavior of the hydroelastic bearing 1, can be adjusted. The decoupling element 18 can for example be clamped securely and immovably in the isolator seat 17, or the decoupling element 18 can be movably arranged in the isolator seat 17 in the direction of flow of the decoupling channel 19, wherein the degree of mobility, i.e., the play, is adjustable. The play of the decoupling element 18 in the isolator seat 17 has a strong influence on the dynamic behavior of the hydroelastic bearing 1.

Given the elastic deformability of the decoupling element 18 and/or the movable arrangement of the decoupling element 18 in the isolator seat 17, an inflow and outflow of the damping fluid into and out of the decoupling channel 19 is enabled during operation, in particular at low excitation amplitudes. The flows of fluid into and out of the decoupling channel 19 as well as the vibrating displacement of the inner mounting connection 4 relative to the outer sleeve 3 from external excitation are indicated with arrows.

Figure 10:
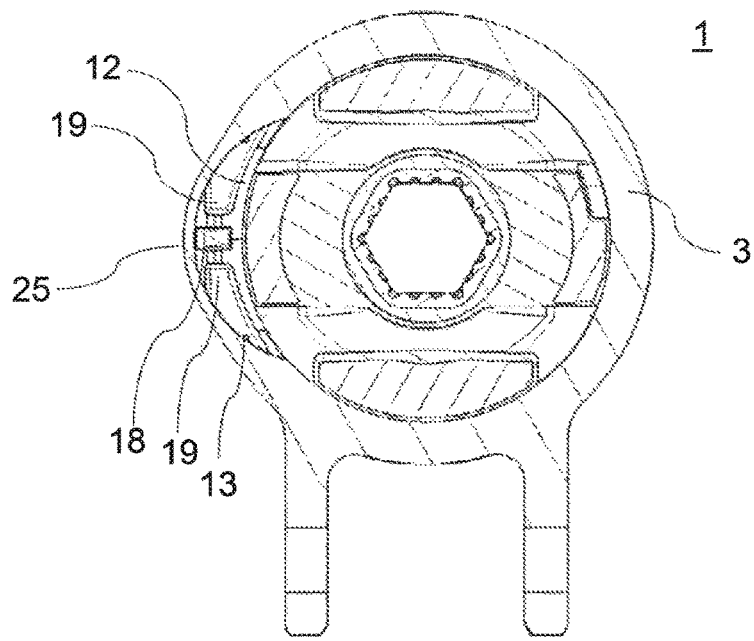
FIG. 10 shows a sectional view of a hydroelastic bearing according to a second embodiment transverse to the axial direction.

FIG. 10 shows a sectional view of a hydroelastic bearing 1 according to a second embodiment. The second embodiment differs from the first embodiment in that the decoupling element 18 is designed lower than in the first embodiment. Lower in this context means that the short edge of the substantially rectangular decoupling element 18 is designed shorter than in the first embodiment. Correspondingly, the decoupling insert 12 and the decoupling recess 13 of the outer sleeve 3 are designed narrower than in the first embodiment so that the curvature 25 is also designed smaller. The outer sleeve 3 is the second embodiment therefore has a nearly symmetrical outer contour. By changing the dimensions of the decoupling element 18 and/or the decoupling channel 19, the dynamic behavior of the hydroelastic bearing 1 can be changed.

Figure 11:
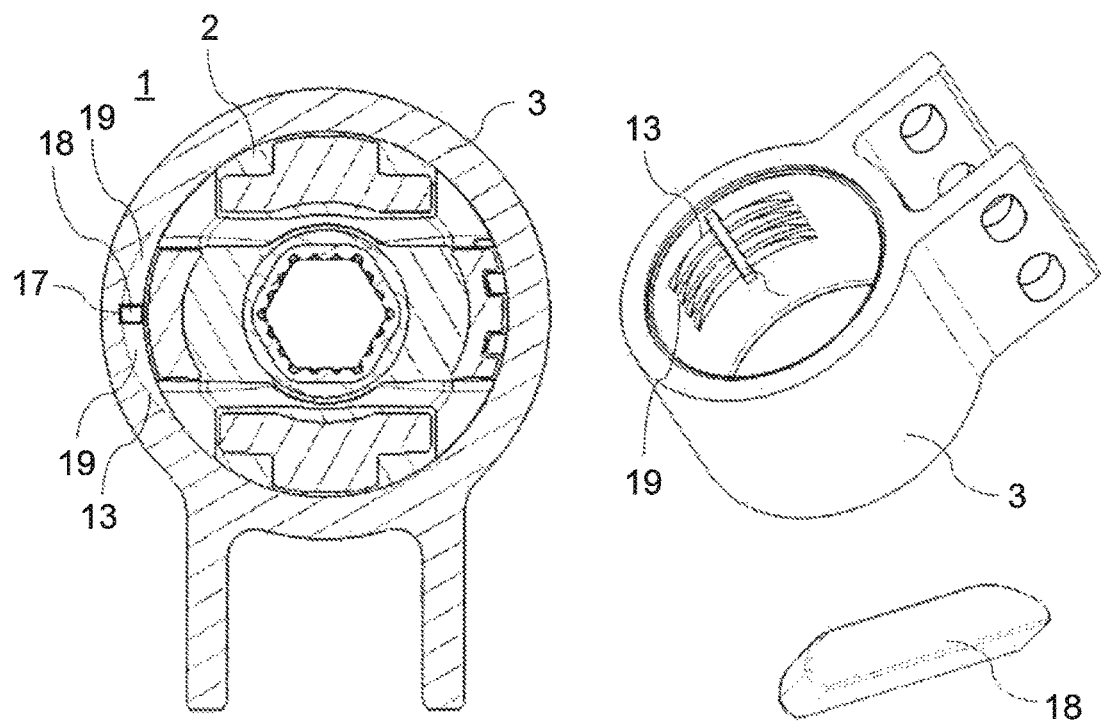
FIG. 11 shows a sectional view of a hydroelastic bearing according to a third embodiment transverse to the axial direction, as well as perspective views of the outer sleeve and the decoupling element thereof.

FIG. 11 shows a sectional view of a hydroelastic bearing 1 according to a third embodiment, as well as perspective views of the outer sleeve 3 and the decoupling element 18 thereof. The basic difference between the third embodiment and the first and second embodiment is that the decoupling channels 19 and the isolator seat 17 are formed in the material of the outer sleeve 3 itself. The decoupling channels 19 are bordered, or respectively formed by dividing walls that run in a peripheral direction of the outer sleeve 3 within the decoupling recess 13. The isolator seat 17 is formed by a recess in the material of the outer sleeve 3 running perpendicular to the decoupling channels 19 in an axial direction of the outer sleeve 3. Radially to the inside, the decoupling channels 19 are bordered by the spring function member 2. The hydroelastic bearing 1 according to the third embodiment does not have a decoupling insert, which allows the production costs to be reduced.

Figure 12:
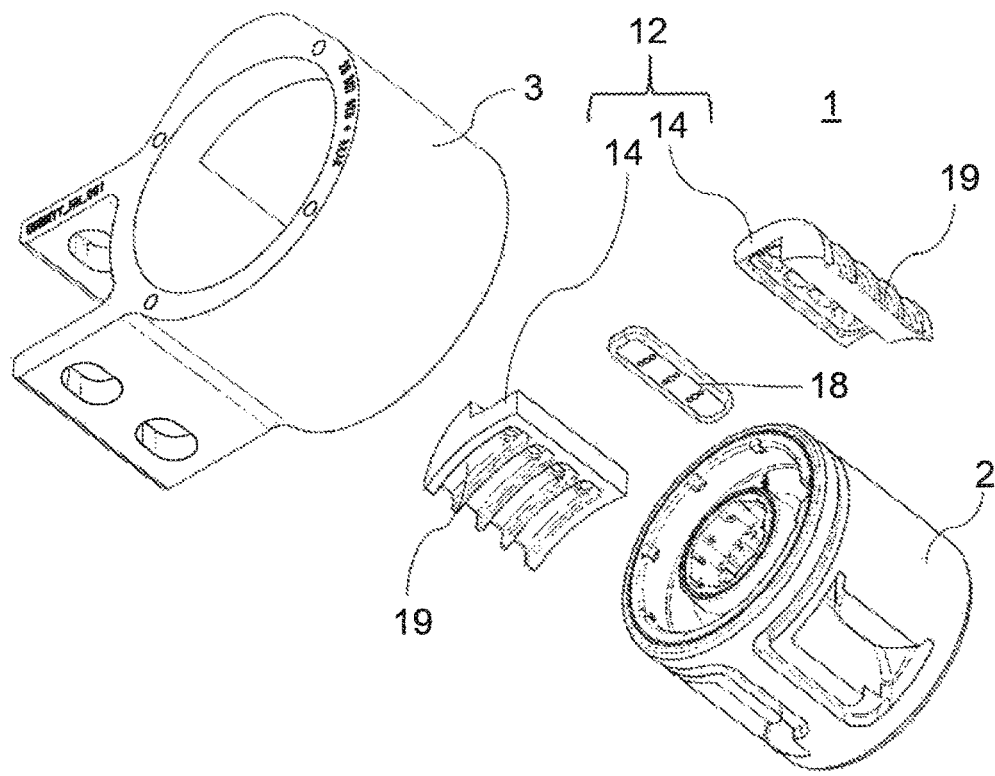
FIG. 12 shows an exploded view of a hydroelastic bearing according to a fourth embodiment.
Figure 13:
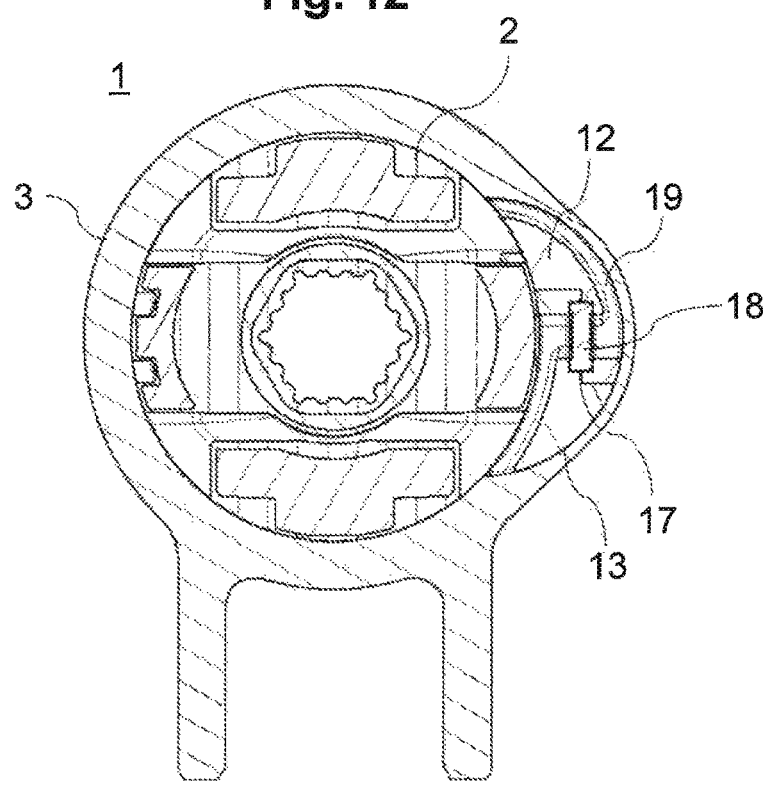
FIG. 13 shows a sectional view of the hydroelastic bearing from FIG. 12 transverse to the axial direction.

FIGS. 12 and 13 show a fourth embodiment of a hydroelastic bearing 1. The basic difference from the previous embodiments is that the decoupling element 18 is arranged in the decoupling insert 12 rotated about 90° on its longitudinal axis. The decoupling insert 12, in particular the configuration of the decoupling channels 19 and the isolator seat 17 therein, are correspondingly adapted. The decoupling insert 12 is divided into two insert parts 14, or respectively halves, of basically the same size in the peripheral direction of the outer sleeve 3. The decoupling channels 19 in one of the insert parts 14, i.e., on one side of the decoupling element 18, are bordered radially to the inside by the spring function member 2, and the decoupling channels 19 in the other one of the insert parts 14, i.e., on the other side of the decoupling element 18, are bordered radially to the outside by the inner wall of the decoupling recess 13 of the outer sleeve 3. During operation, the decoupling element 18 vibrates in a radial direction. By changing the arrangement of the decoupling element 18, the dynamic behavior of the hydroelastic bearing 1 changes.

Figure 14:
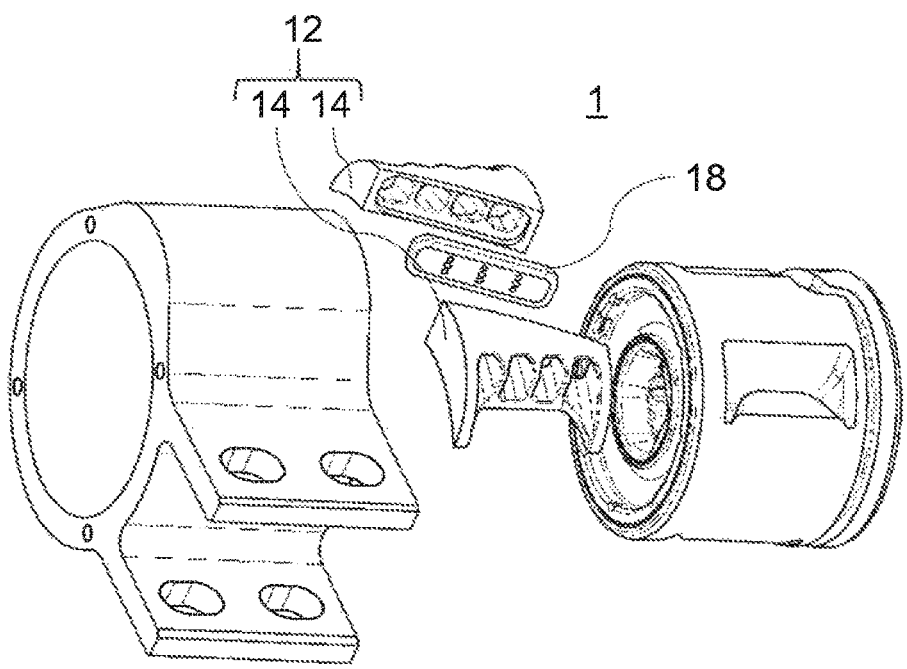
FIG. 14 shows an exploded view of a hydroelastic bearing according to a fifth embodiment.
Figure 15:
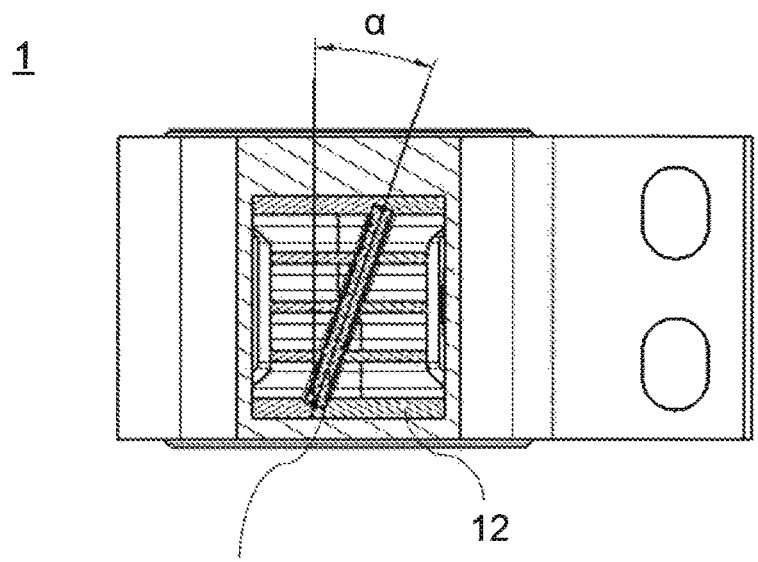
FIG. 15 shows a sectional view of the hydroelastic bearing from FIG. 14 in an axial direction.

FIGS. 14 and 15 show a fifth embodiment of a hydroelastic bearing 1. The fifth embodiment constitutes a variation of the first embodiment. In the fifth embodiment, the decoupling element 18, in particular the hitting-surface, or respectively the longitudinal axis thereof, is arranged at an angle α to the axial direction of the hydroelastic bearing 1. In the first embodiment, the decoupling element 18 is contrastingly arranged parallel to the axial direction of the hydroelastic bearing 1. The angle α can for example be adjusted within a range of approximately 1° to approximately 90°, more particularly within a range of approximately 5° to approximately 30°, wherein the dynamic behavior of the hydroelastic bearing 1 can be changed by adjusting the angle α. The decoupling element 18, in particular the hitting-surface, or respectively the transverse axis thereof, is arranged, or respectively aligned substantially parallel to the radial direction of the hydroelastic bearing 1 at the position of the decoupling element 18. The decoupling insert 12, in particular the isolator seat 17, and the decoupling channels 19 thereof, are designed adapted corresponding to the arrangement of the decoupling element 18.

Figure 16:
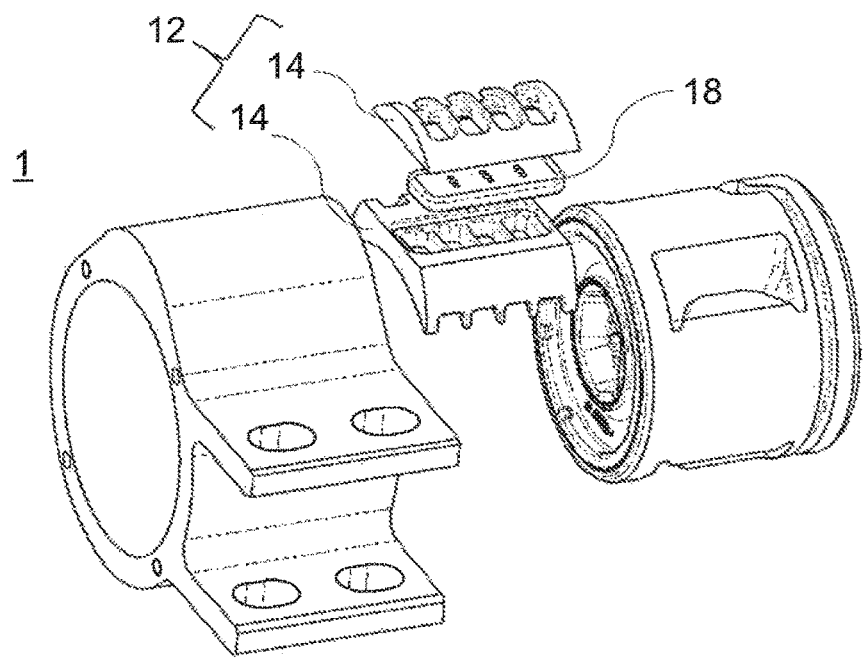
FIG. 16 shows an exploded view of a hydroelastic bearing according to a sixth embodiment.
Figure 17:
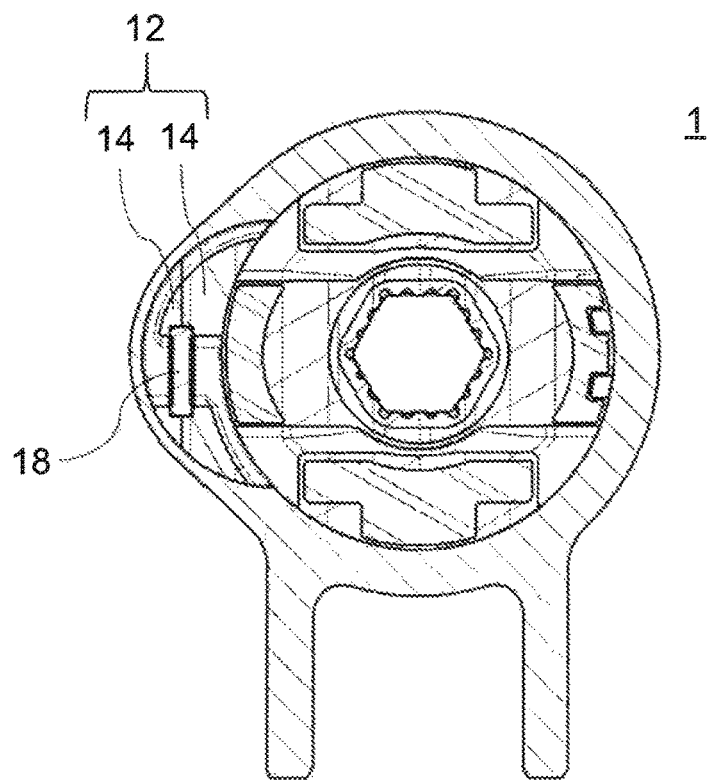
FIG. 17 shows a sectional view of the hydroelastic bearing from FIG. 16 transverse to the axial direction.

FIGS. 16 and 17 show a sixth embodiment of a hydroelastic bearing 1. The sixth embodiment constitutes a variation of the fourth embodiment. The basic difference of the sixth embodiment from the fourth embodiment is that the decoupling element 18 is arranged in a decoupling insert 12 that is divided into two differently sized insert parts 14, or respectively halves in the radial direction of the outer sleeve 3. The insert part 14 lying radially to the outside is lid-like and designed smaller than the insert part 14 lying radially to the inside. The decoupling insert 12 according to the sixth embodiment makes it easier to install the hydroelastic bearing 1.

Figure 18:
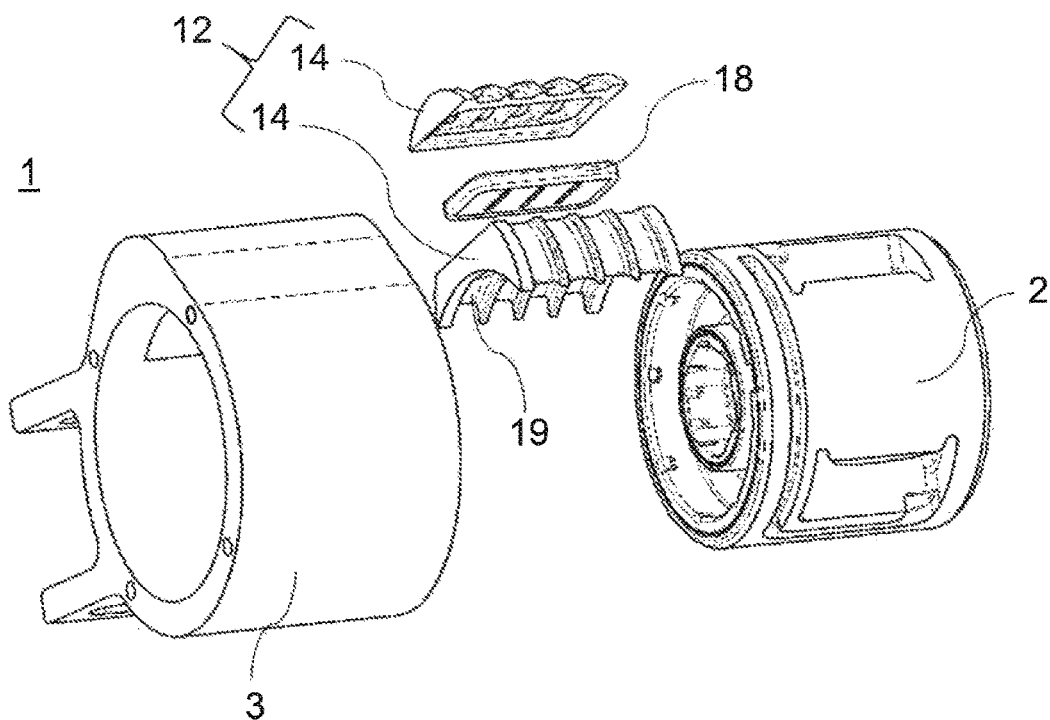
FIG. 18 shows an exploded view of a hydroelastic bearing according to a seventh embodiment.
Figure 19:
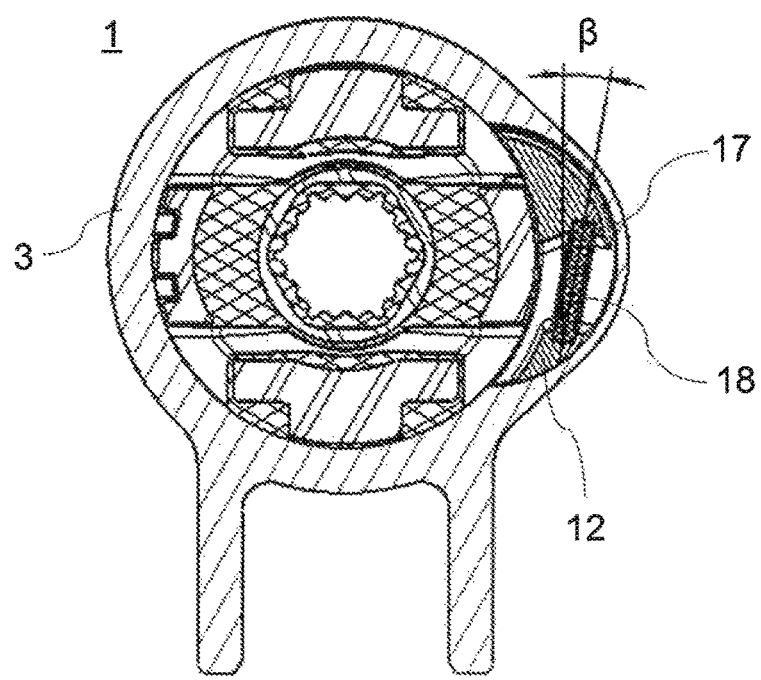
FIG. 19 shows a sectional view of the hydroelastic bearing from FIG. 18 transverse to the axial direction.

FIGS. 18 and 19 show a seventh embodiment of a hydroelastic bearing 1. The seventh embodiment constitutes a variation of the sixth embodiment. In the seventh embodiment, the decoupling element 18, in particular the hitting-surface, or respectively the transverse axis thereof, is arranged at an angle β to the tangential direction of the hydroelastic bearing 1 at the position of the decoupling element 18. In the sixth embodiment, the decoupling element 18 is contrastingly arranged parallel to the tangential direction of the hydroelastic bearing 1. The tangential direction is perpendicular to the radial direction of the hydroelastic bearing 1 at the position of the decoupling element 18. The angle β can for example be adjusted within a range of approximately 1° to approximately 89°, more particularly within a range of approximately 5° to approximately 20°, wherein the dynamic behavior of the hydroelastic bearing 1 can be changed by adjusting the angle β. The decoupling element 18, in particular the hitting-surface, or respectively the longitudinal axis thereof, is arranged, or respectively aligned substantially parallel to the axial direction of the hydroelastic bearing 1. The decoupling insert 12, in particular the isolator seat 17, and the decoupling channels 19 thereof, are designed adapted corresponding to the arrangement of the decoupling element 18. According to the fifth embodiment, the angle β of the decoupling element relative to the tangential direction can also be combined with an angle α relative to the axial direction.

Figure 20:
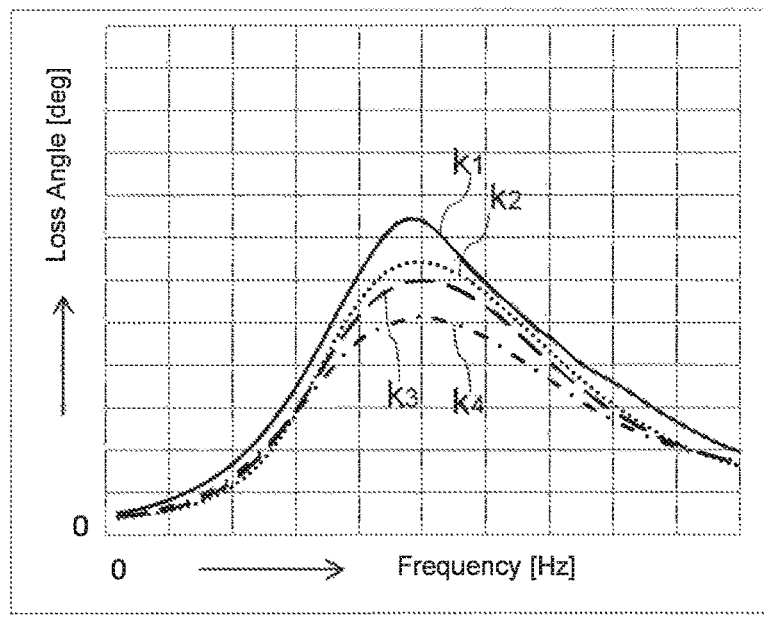
FIG. 20 shows a graphic representation of the loss angle of the hydroelastic bearing depending on the excitation frequency in the low-frequency range and at high amplitudes with different configurations.
Figure 21:
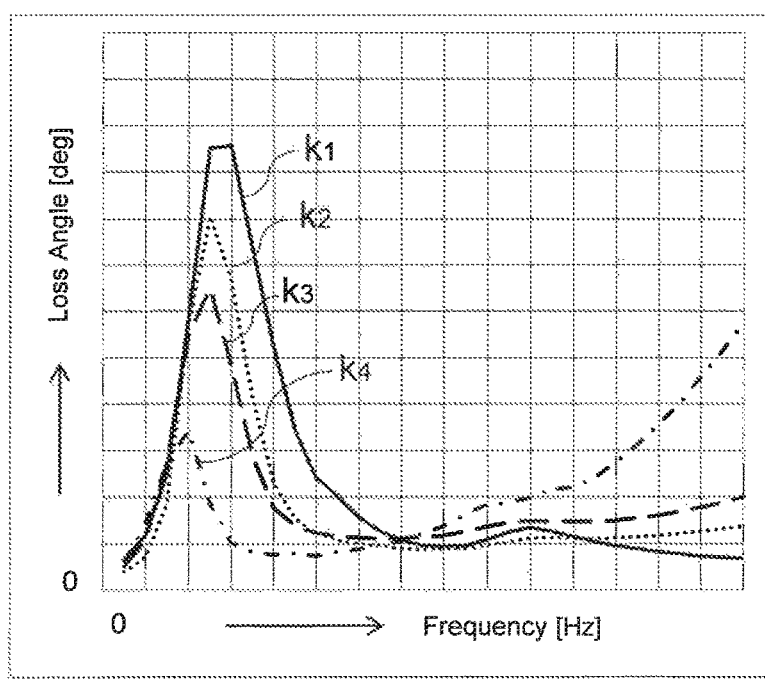
FIG. 21 shows a graphic representation of the loss angle of the hydroelastic bearing depending on the excitation frequency in the high-frequency range and at low amplitudes with different configurations.

FIG. 20 shows a graphic representation of the loss angle of the hydroelastic bearing depending on the excitation frequency in the low frequency range and at high amplitudes with different configurations $k_1$, $k_2$, $k_3$ and $k_4$ of the hydroelastic bearing, and FIG. 21 shows a graphic representation of the loss angle of the hydroelastic bearing depending on the excitation frequency within a high-frequency range and at low amplitudes for the different configurations $k_1$, $k_2$, $k_3$ and $k_4$. According to configuration $k_1$ of the hydroelastic bearing, no decoupling channel is provided with a decoupling element. According to configuration $k_2$, a decoupling channel is provided with a decoupling element, wherein the isolator seat is designed relative to the thickness of the decoupling element such that there is only slight mobility, or respectively slight play for the decoupling element in the isolator seat. With configuration $k_3$, the play of the decoupling element is greater than configuration $k_2$, and with configuration $k_4$, the play of the decoupling element is the greatest of all configurations. The remaining design of the hydroelastic bearing is the same for all configurations so that FIGS. 20 to 23 represent examples of the influence of the play of the decoupling element on the dynamic behavior of the hydroelastic bearing.

As can be seen in FIG. 20, the difference in the loss angle as an indicator of the damping is relatively slight at high excitation amplitudes in the different configurations. At low excitation amplitudes as depicted in FIG. 21, the difference in loss angles is contrastingly very large between the different configurations. This reveals that the dynamic behavior of the hydroelastic bearing in the low amplitude range can be specifically adjusted by the configuration of the decoupling channel and the decoupling element.

Figure 22:
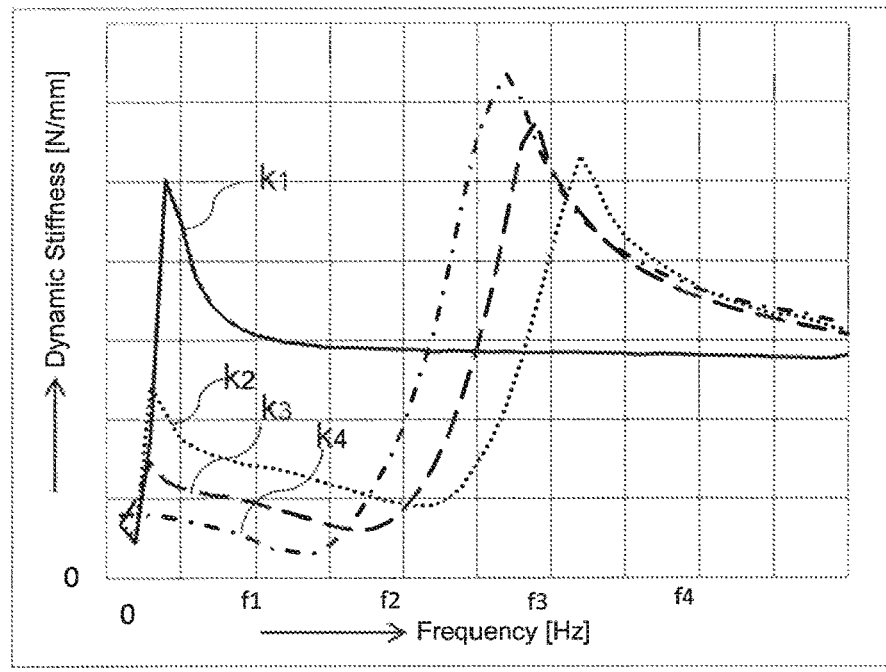
FIG. 22 shows a graphic representation of the dynamic rigidity of the hydroelastic bearing depending on the excitation frequency in the high-frequency range at low amplitudes and with a large isolation surface with different configurations.
Figure 23:
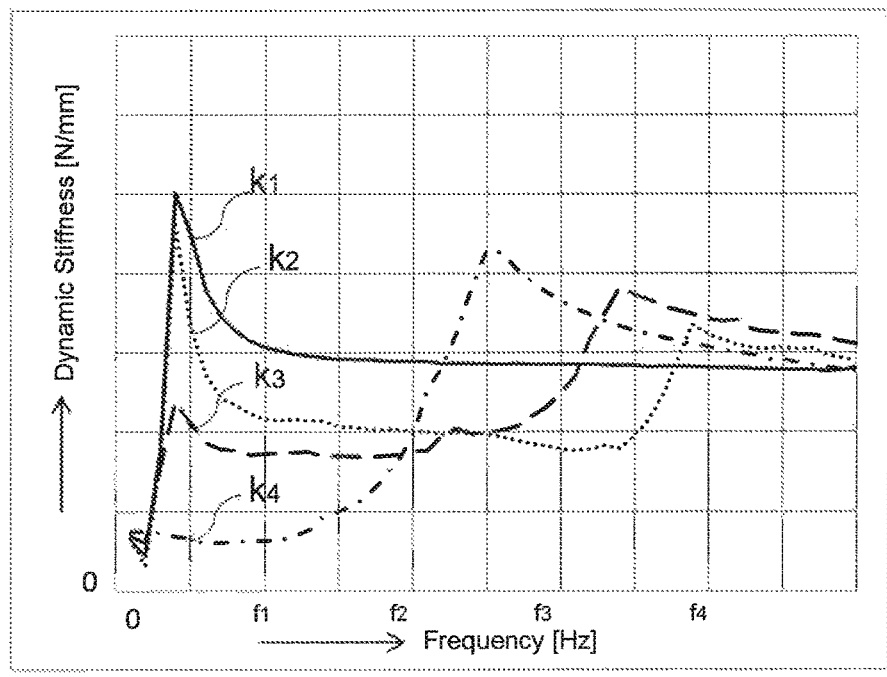
FIG. 23 shows a graphic representation of the dynamic rigidity of the hydroelastic bearing depending on the excitation frequency in the high-frequency range at low amplitudes and with a small isolation surface with different configurations.

FIGS. 22 and 23 show graphic representations of the dynamic rigidity of the hydroelastic bearing depending on the excitation frequency, wherein the difference between the embodiments of the hydroelastic bearing in FIG. 22 and FIG. 23 lies in the size, or respectively in the size ratio between the decoupling element and decoupling channel. FIG. 22 shows an instance in which the isolation surface is large, and the ratio of the decoupling channel cross-section to the decoupling channel length is also large. FIG. 23 contrastingly shows an instance in which the isolation surface is small, and the ratio of the decoupling channel cross-section to the decoupling channel length is also small. "Isolation surface" means the hitting-surface of the decoupling element. The configurations k1, k2, k3 and k4 are as described above. FIGS. 22 and 23 show that the dynamic rigidity can be specifically adjusted as needed in terms of height and frequency. The fact that the dynamic rigidity initially falls to a value below the static rigidity in some configurations is due to the so-called notch effect.

What is claimed is:

1. A hydroelastic bearing comprising a spring function member and an outer sleeve coupled to the spring function member,
   wherein the spring function member comprises an inner mounting connection and at least two working chambers which are filled with a damping fluid and which are connected via at least one damping channel, so that the damping fluid flows from one of the working chambers at least partly to the other via the at least one damping channel upon displacement of the inner mounting connection with respect to the outer sleeve,
   wherein the working chambers are further connected via at least one decoupling channel,
   wherein a decoupling element is arranged in a flow path of the decoupling channel,
   wherein the outer sleeve defines a decoupling recess therein, the decoupling recess open radially inward and bordered by the outer sleeve in an axial direction and in an outward radial direction, and wherein the decoupling channel and the decoupling element are at least partly arranged in the decoupling recess in the outer sleeve.

2. The hydroelastic bearing of claim 1, wherein the decoupling recess is formed radially outward with respect to the spring function member.

3. The hydroelastic bearing of claim 2, further comprising a decoupling insert which is at least partly placed in the decoupling recess,
wherein the decoupling channel is formed in the decoupling insert, and
wherein the decoupling element is arranged in the decoupling insert.

4. The hydroelastic bearing of claim 2, wherein the decoupling element is one of an elastomeric plate and a clamped elastomeric membrane.

5. The hydroelastic bearing of claim 2, wherein a hitting-surface of the decoupling element, onto which the damping fluid hits, is inclined at a predetermined angle ($\alpha$, $\beta$) with respect to at least one of an axial direction of the hydroelastic bearing and a radial direction of the hydroelastic bearing.

6. The hydroelastic bearing of claim 2, wherein at least one overpressure-passage is formed in the decoupling element.

7. The hydroelastic bearing of claim 1, further comprising a decoupling insert which is at least partly placed in the decoupling recess,
wherein the decoupling channel is formed in the decoupling insert, and
wherein the decoupling element is arranged in the decoupling insert.

8. The hydroelastic bearing of claim 7, wherein the decoupling insert comprises two insert parts, and wherein the decoupling element is arranged between the two insert parts.

9. The hydroelastic bearing of claim 8, wherein the decoupling element is one of an elastomeric plate and a clamped elastomeric membrane.

10. The hydroelastic bearing of claim 8, wherein a hitting-surface of the decoupling element, onto which the damping fluid hits, is inclined at a predetermined angle ($\alpha$, $\beta$) with respect to at least one of an axial direction of the hydroelastic bearing and a radial direction of the hydroelastic bearing.

11. The hydroelastic bearing of claim 7, wherein the decoupling element is one of an elastomeric plate and a clamped elastomeric membrane.

12. The hydroelastic bearing of claim 7, wherein a hitting-surface of the decoupling element, onto which the damping fluid hits, is inclined at a predetermined angle ($\alpha$, $\beta$) with respect to at least one of an axial direction of the hydroelastic bearing and a radial direction of the hydroelastic bearing.

13. The hydroelastic bearing of claim 7, wherein at least one overpressure-passage is formed in the decoupling element.

14. The hydroelastic bearing of claim 1, wherein the decoupling element is one of an elastomeric plate and a clamped elastomeric membrane.

15. The hydroelastic bearing of claim 14, wherein a hitting-surface of the decoupling element, onto which the damping fluid hits, is inclined at a predetermined angle ($\alpha$, $\beta$) with respect to at least one of an axial direction of the hydroelastic bearing and a radial direction of the hydroelastic bearing.

16. The hydroelastic bearing of claim 1, wherein a hitting-surface of the decoupling element, onto which the damping fluid hits, is inclined at a predetermined angle ($\alpha$, $\beta$) with respect to at least one of an axial direction of the hydroelastic bearing and a radial direction of the hydroelastic bearing.

17. The hydroelastic bearing of claim 1, wherein at least one overpressure-passage is formed in the decoupling element.

18. The hydroelastic bearing of claim 1, wherein at least one stopping burl is formed on the decoupling element.

19. The hydroelastic bearing of claim 1, wherein the flow path of the damping fluid from one of the working chambers to the other working chamber via the decoupling channel does not comprise corners or other abrupt changes of direction.

20. The hydroelastic bearing of claim 1, comprising a plurality of decoupling channels, which connect the working chambers,
wherein the decoupling element is arranged in flow paths of all decoupling channels.

* * * * *